(12) United States Patent
Pan et al.

(10) Patent No.: US 12,523,903 B2
(45) Date of Patent: Jan. 13, 2026

(54) DISPLAY PANEL AND ELECTRONIC DEVICE

(71) Applicant: TCL China Star Optoelectronics Technology Co., Ltd., Guangdong (CN)

(72) Inventors: Yaoxin Pan, Guangdong (CN); Tuo Feng, Guangdong (CN); Jintao Jiang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 228 days.

(21) Appl. No.: 17/796,651

(22) PCT Filed: Jul. 29, 2022

(86) PCT No.: PCT/CN2022/108835
§ 371 (c)(1),
(2) Date: Jul. 31, 2022

(87) PCT Pub. No.: WO2024/007387
PCT Pub. Date: Jan. 11, 2024

(65) Prior Publication Data
US 2024/0184158 A1    Jun. 6, 2024

(30) Foreign Application Priority Data

Jul. 5, 2022   (CN) .......................... 202210792421.7

(51) Int. Cl.
*G02F 1/1335*     (2006.01)
*G02F 1/1339*     (2006.01)

(52) U.S. Cl.
CPC ...... *G02F 1/133512* (2013.01); *G02F 1/1339* (2013.01)

(58) Field of Classification Search
None
See application file for complete search history.

(56) References Cited

U.S. PATENT DOCUMENTS

2007/0291216 A1* 12/2007 Chan ..................... G02F 1/1339
                                                          349/110
2009/0303427 A1* 12/2009 Kondo .................. G02F 1/1339
                                                          349/190

(Continued)

FOREIGN PATENT DOCUMENTS

CN    205844685      12/2016
CN    106556946       4/2017

(Continued)

OTHER PUBLICATIONS

International Search Report and the Written Opinion Dated Dec. 16, 2022 From the International Searching Authority Re. Application No. PCT/CN2022/108835 and Its Translation Into English. (18 Pages).

(Continued)

*Primary Examiner* — Shan Liu

(57) ABSTRACT

A display panel and an electronic device are provided. The display panel includes a first substrate and a second substrate disposed opposite to each other, and a sealant between the first substrate and the second substrate. The light-shielding layer is located on a side of the second substrate facing toward the first substrate, and grooves are defined at positions where the sealant is. The grooves penetrate the light-shielding layer to block a path of water vapor entering the display panel through the light-shielding layer, thereby easing a problem of the intrusion path of the water vapor in current liquid crystal display panels.

13 Claims, 5 Drawing Sheets

(56) References Cited

U.S. PATENT DOCUMENTS

| | | | |
|---|---|---|---|
| 2012/0206669 A1* | 8/2012 | Kim | G02F 1/133308 |
| | | | 349/153 |
| 2013/0057812 A1 | 3/2013 | Kwak et al. | |
| 2016/0077376 A1* | 3/2016 | Lee | G02F 1/133512 |
| | | | 349/110 |
| 2016/0238866 A1* | 8/2016 | Yamaguchi | G02F 1/1339 |
| 2018/0149910 A1* | 5/2018 | Wang | G02F 1/136286 |
| 2020/0379293 A1 | 12/2020 | Ohashi et al. | |
| 2023/0194929 A1* | 6/2023 | Sun | G02F 1/1339 |
| | | | 349/106 |

FOREIGN PATENT DOCUMENTS

| | | | | |
|---|---|---|---|---|
| CN | 106556946 A | * | 4/2017 | G02F 1/1333 |
| CN | 207366901 | | 5/2018 | |
| CN | 110426879 | | 11/2019 | |
| CN | 110426881 | | 11/2019 | |
| CN | 110703490 A | * | 1/2020 | G02F 1/1333 |
| CN | 114545690 | | 5/2022 | |
| CN | 114690487 | | 7/2022 | |
| JP | 2002258261 A | * | 9/2002 | |
| JP | 2010-085803 | | 4/2010 | |
| JP | 2012-042645 | | 3/2012 | |

OTHER PUBLICATIONS

Notification of Office Action and Search Report Dated Apr. 10, 2023 From the State Intellectual Property Office of the People's Republic of China Re. Application No. 202210792421.7 and Its Translation Into English. (18 Pages).

\* cited by examiner

DISPLAY PANEL AND ELECTRONIC DEVICE

RELATED APPLICATIONS

This application is a National Phase of PCT Patent Application No. PCT/CN2022/108835 having International filing date of Jul. 29, 2022, which claims the benefit of priority of Chinese Patent Application No. 202210792421.7 filed on Jul. 5, 2022. The contents of the above applications are all incorporated by reference as if fully set forth herein in their entirety.

FIELD AND BACKGROUND OF THE INVENTION

The present application relates to the field of display technologies, and particularly relates to a display panel and an electronic device.

Liquid crystal display (LCD) panels are current mainstream display panels and have advantages such as low cost and mature technology, etc. In encapsulation processes of the current liquid crystal display panels, sealant needs to be coated on surfaces of black matrices (BMs) to block intrusion of water vapor. However, the water vapor can still enter the LCD panels through the black matrices, which affects encapsulation effect of the LCD panels.

SUMMARY OF THE INVENTION

The present application provides a display panel and an electronic device to ease a technical problem that the current intrusion paths of the water vapor exist in the current liquid crystal display panels.

In order to solve the problems mentioned above, the present application provides the technical solutions as follows:

One embodiment of the present application provides a display panel, including a display region and a non-display region enclosing the display region. The display panel includes:
  a first substrate.
  a second substrate disposed opposite to the first substrate;
  a liquid crystal layer disposed between the first substrate and the second substrate;
  a light-shielding layer disposed on a side of the second substrate facing toward the first substrate;
  a sealant disposed between the first substrate and the light-shielding layer and enclosing the liquid crystal layer, wherein the sealant includes a plurality of straight-line portions and a plurality of curved portions connected end-to-end, and each of the curved portions is connected between two adjacent straight-line portions; and
  wherein grooves are defined in the light-shielding layer at corresponding regions where the sealant is disposed.

In the display panel provided by one embodiment of the present application, the grooves include first sub-grooves, and the first sub-grooves enclose the display region.

In the display panel provided by one embodiment of the present application, the first sub-grooves include a plurality of first groove portions spaced apart, the plurality of first groove portions are sequentially arranged spaced apart in an annular route enclosing the display region, and first intervals are between adjacent two of the plurality of first groove portions.

In the display panel provided by one embodiment of the present application, the grooves further include second sub-grooves located on a side of the first sub-grooves, and the second sub-grooves are disposed corresponding to the curved portions.

In the display panel provided by one embodiment of the present application, the second sub-grooves include a plurality of second groove portions spaced apart, the plurality of second groove portions are sequentially arranged spaced apart in an annular route enclosing the display region, and second intervals are between adjacent two of the plurality of second groove portions.

In the display panel provided by one embodiment of the present application, the first sub-grooves include a plurality of first groove portions spaced apart, the plurality of first groove portions are sequentially arranged spaced apart in an annular route enclosing the display region, first intervals are between adjacent two of the plurality of first groove portions, and the first intervals and the second intervals are arranged in a stagger manner.

In the display panel provided by one embodiment of the present application, the grooves further include third sub-grooves located on a side of the first sub-grooves away from the second sub-grooves, and the third sub-grooves are disposed corresponding to the curved portions.

In the display panel provided by one embodiment of the present application, the second sub-grooves are further defined corresponding to the straight-line portions, and the third sub-grooves are further defined corresponding to the straight-line grooves.

In the display panel provided by one embodiment of the present application, the third sub-grooves include a plurality of third groove portions spaced apart, the plurality of third groove portions are sequentially arranged spaced apart in an annular route enclosing the display region, and third intervals are between adjacent two of the plurality of third groove portions.

In the display panel provided by one embodiment of the present application, the first sub-grooves include a plurality of first groove portions spaced apart, the plurality of first groove portions are sequentially arranged spaced apart in an annular route enclosing the display region, first intervals are between adjacent two of the plurality of first groove portions, and the first intervals and the third intervals are arranged in a stagger manner.

In the display panel provided by one embodiment of the present application, the second sub-grooves include a plurality of second groove portions spaced apart, the plurality of second groove portions are sequentially arranged spaced apart in an annular route enclosing the display region, second intervals are between adjacent two of the plurality of second groove portions, and the second intervals and the third intervals are arranged in a stagger manner.

In the display panel provided by one embodiment of the present application, lengths of the first intervals, the second intervals, and the third intervals range from 10 μm to 200 μm.

In the display panel provided by one embodiment of the present application, the first sub-grooves, the second sub-grooves, and the third sub-grooves correspond to regions of the sealant away from the display region.

In the display panel provided by one embodiment of the present application, the grooves further include fourth sub-grooves located on a side of the third sub-grooves away from the first sub-grooves, and the fourth sub-grooves correspond to regions of the sealant close to the display region.

In the display panel provided by one embodiment of the present application, widths of the first sub-grooves, the second sub-grooves, the third sub-grooves, and the fourth sub-grooves range from 10 μm to 30 μm.

In the display panel provided by one embodiment of the present application, the grooves penetrate the light-shielding layer.

In the display panel provided by one embodiment of the present application, the grooves penetrate the light-shielding layer and extend into a part of the second substrate.

In the display panel provided by one embodiment of the present application, the sealant is filled in the grooves.

In the display panel provided by one embodiment of the present application, a sectional shape of the grooves includes a trapezoidal shape, and an opening of the grooves at a side close to second substrate is smaller than an opening of the grooves at a side away from the second substrate.

One embodiment of the present application further provides an electronic device, including a housing and the display panel of one of the aforesaid embodiments. The housing forms a storage cavity, and the display panel is assembled in the storage cavity.

In the display panel and the electronic device provided by the present application, by defining grooves in the light-shielding layer corresponding to the sealant to block the path of the water vapor entering into the display panel through the light-shielding layer, the problem of the intrusion path of the water vapor in the current liquid crystal display panels is solved.

BRIEF DESCRIPTION OF THE SEVERAL VIEWS OF THE DRAWINGS

To more clearly illustrate embodiments or the technical solutions of the present application, the accompanying figures of the present application required for illustrating embodiments or the technical solutions of the present application will be described in brief. Obviously, the accompanying figures described below are only a part of the embodiments of the present application, from which figures those skilled in the art can derive further figures without making any inventive efforts.

DETAILED DESCRIPTION OF SPECIFIC EMBODIMENTS OF THE INVENTION

Figure 1:
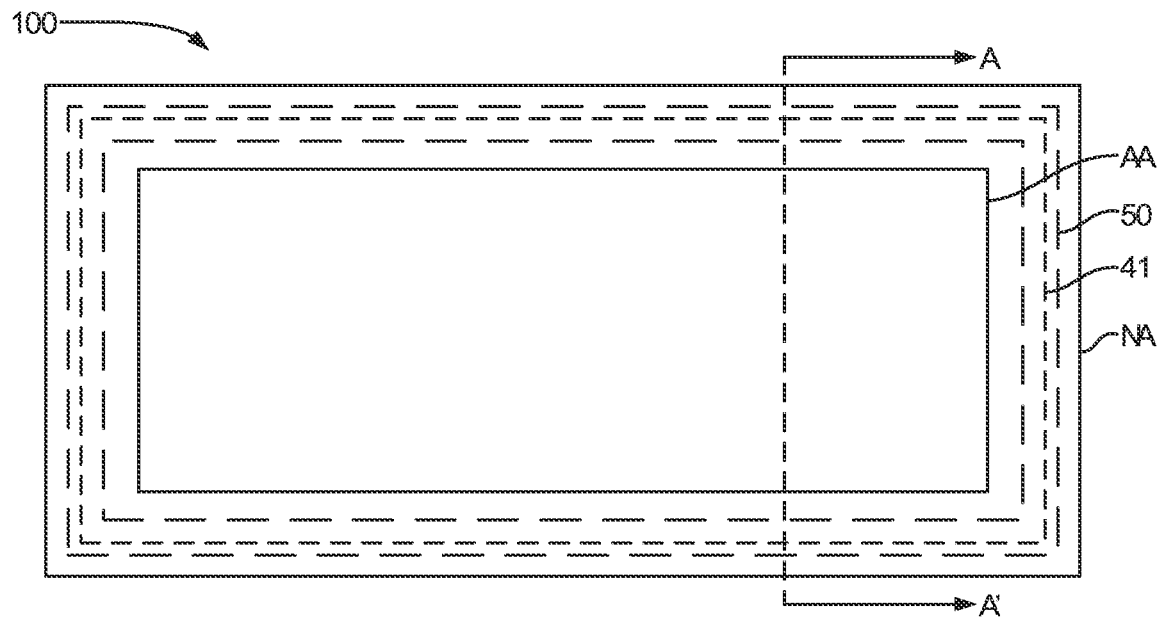
FIG. 1 is a top-view structural diagram of a display panel provided by one embodiment of the present application.

The descriptions of embodiments below refer to accompanying drawings in order to illustrate certain embodiments which the present application can implement. The directional terms of which the present application mentions, for example, "top", "bottom", "upper", "lower", "front", "rear", "left", "right", "inside", "outside", "side", etc., only refer to directions of the accompanying figures. Therefore, the used directional terms are for illustrating and understanding the present application, but not for limiting the present application. In the figures, units with similar structures are indicated by the same reference numerals. In the drawings, the thicknesses of layers and regions are exaggerated for clarity. The dimensions and thickness of each component shown in the accompanying figures are arbitrarily shown, present application is not limited thereto.

Figure 2:
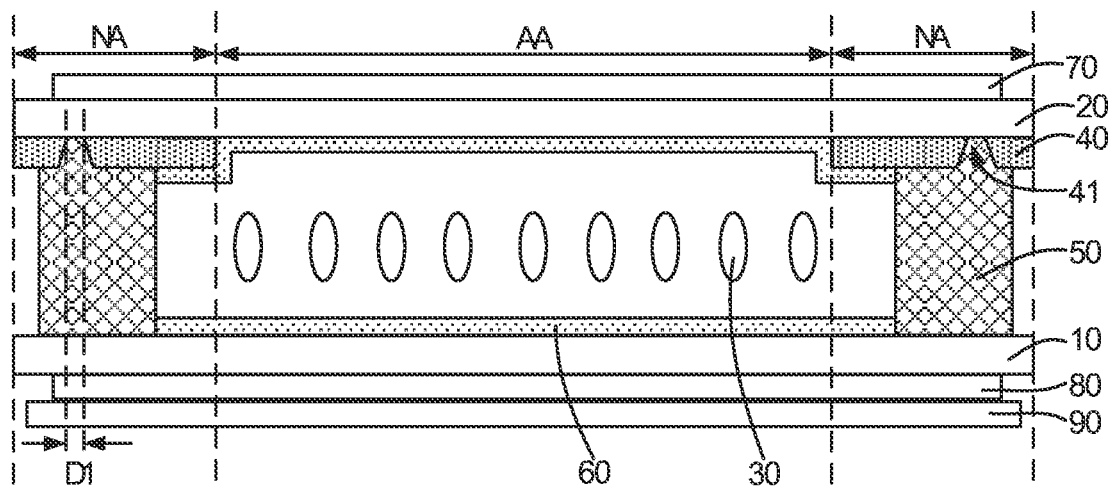
FIG. 2 is a schematic diagram of a sectional structure along line A-A' in FIG. 1.
Figure 3:
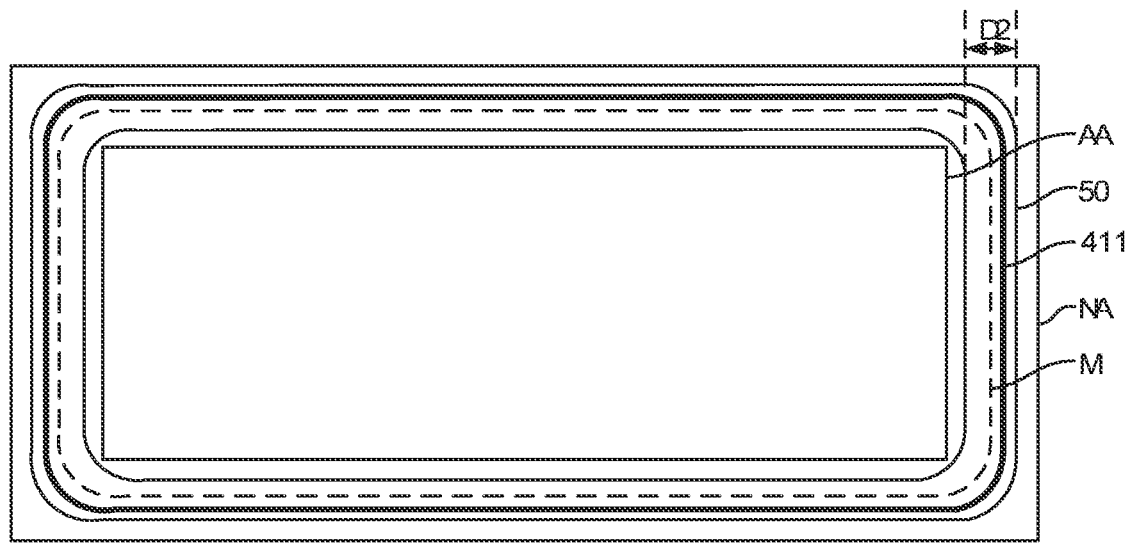
FIG. 3 is a top-view structural diagram of groove arrangement in FIG. 2.
Figure 4:
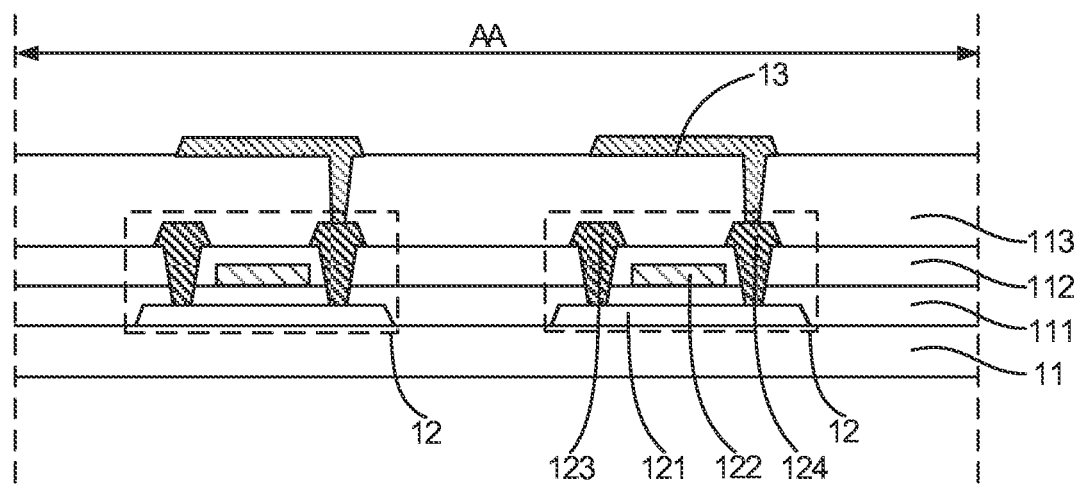
FIG. 4 is a structural schematic diagram of a part of details of a first substrate in FIG. 2.

Please refer to FIG. 1 to FIG. 4. FIG. 1 is a top-view structural diagram of a display panel provided by one embodiment of the present application. FIG. 2 is a schematic diagram of a sectional structure along line A-A' in FIG. 1. FIG. 3 is a top-view structural diagram of groove arrangement in FIG. 2. FIG. 4 is a structural schematic diagram of a part of details of a first substrate in FIG. 2. The display panel 100 includes a display region AA and a non-display region NA enclosing the display region AA. The display region AA is configured to display pixels. The non-display region NA is configured to dispose an encapsulation structure, edge wirings, etc.

Specifically, the display panel 100 further includes a first substrate 10 and a second substrate 20 disposed opposite to each other, and a liquid crystal layer 30, a light-shielding layer 40, and a sealant 50 disposed between the first substrate 10 and the second substrate 20. The liquid crystal layer 30 is disposed corresponding to the display region AA. The light-shielding layer 40 is disposed on a side of the second substrate 20 facing toward the first substrate 10 and is disposed corresponding to the non-display region NA. The sealant 50 is disposed between the first substrate 10 and the light-shielding layer 40 and encloses the liquid crystal layer 30. Grooves 41 are defined in the light-shielding layer 40 at corresponding regions where the sealant 50 is disposed.

Optionally, the first substrate 10 is an array substrate, and the second substrate 20 is a color filter substrate, but the present application is not limited thereto. The first substrate 10 of the present application can also be a gate-driver-on-array (GOA) substrate or a color-filter-on-array (COA) substrate, etc.

As illustrated in FIG. 2, the sealant 50 is disposed between the first substrate 10 and the second substrate 20, and is located in the non-display region NA. Furthermore, compared to boundaries of the first substrate 10 and the second substrate 20, a part of the sealant 50 shrinks toward the display region AA, so that cutting the sealant 50 and then generating breakage matters is prevented when the first substrate 10 and the second substrate 20 are cut.

The sealant 50 is configured to bond the first substrate 10 and the second substrate 20 to combine the first substrate 10 and the second substrate 20 together. Meanwhile, the sealant 50 further encloses the liquid crystal layer 30 and is configured to seal the liquid crystal layer 30 to prevent the water vapor from entering into the liquid crystal layer 30.

The light-shielding layer 40 is located on the side of the second substrate 20 facing toward the first substrate 10 and is disposed corresponding to the non-display region NA. A material of the light-shielding layer 40 includes a black matrix (BM), etc. The light-shielding layer 40 is configured to shield light to prevent light leakage in the non-display region NA of the display panel 100.

The light-shielding layer 40 contacts with a side of the sealant 50, and a disposing region of the light-shielding layer 40 is larger than a disposing region of the sealant 50, i.e., an orthogonal projection of the sealant 50 located on the second substrate 20 is within a range of an orthogonal projection of the light-shielding layer 40 on the first substrate 10. In this way, a part of the light-shielding layer 40 contacts with environment, and the water vapor can enter the display panel 100 through the light-shielding layer 40.

In order to prevent the water vapor from entering into the display panel 100 through the light-shielding layer 40, the grooves 41 are defined in the light-shielding layer 40 at corresponding regions where the sealant 50 is disposed. The grooves 41 penetrate the light-shielding layer 40 to block the water vapor and to cut off the intrusion path of the water vapor. Specifically, the grooves 41 are formed by defining holes in the light-shielding layer 40, and the sealant 50 is filled in the grooves 41.

A sectional shape of the grooves 41 includes a trapezoidal shape, etc. When the sectional shape of the grooves 41 is the trapezoidal shape, an opening of the grooves 41 at a side close to second substrate 20 is smaller than an opening of the grooves 41 at a side away from the second substrate 20. Of course, the present application is not limited thereto. A block structure can be further inserted into the grooves 41 in the present application. Ability of the blocking structure to block the water vapor of is greater than the ability of the light-shielding layer 40 to block the water vapor.

Optionally, as illustrated in FIG. 3, the grooves 41 include first sub-grooves 411, and the first sub-grooves 411 enclose the display region AA. The first sub-grooves 411 are formed by defining consecutive grooves in the light-shielding layer 40. A width of the first sub-grooves 411 ranges from 10 µm to 30 µm to ensure the ability of blocking the water vapor of the first sub-grooves 411.

Meanwhile, by making the width of the first sub-grooves 411 to be smaller than or equal to the width of the edge wirings in the non-display region NA, the edge wirings of the non-display region NA are made to compensate a light-shielding function of the light-shielding layer 40. Wherein, the width of the first sub-grooves 411 can refer to the width D1 of the grooves 41 illustrated in FIG. 2.

It can be understood that by defining the holes in the light-shielding layer 40 to form the first sub-grooves 411, light can leak from the holes in the light-shielding layer 40, thereby affecting display of the display region AA. By configuring the first sub-grooves 411 with an appropriate width, the edge wirings of the non-display region NA can be made to block light, and light leakage at the holes of the light-shielding layer 40 can be remedied.

Furthermore, the first sub-grooves 411 correspond to a region of the sealant 50 away from the display region AA, so as to further relieve influence of the light leakage problem that the light-shielding layer 40 may have due to defining holes in the display region AA, while can further remedy a reflection problem during the light-shielding function of the light-shielding layer 40 being compensated by the edge wirings.

Specifically, the orthogonal projection of the first sub-grooves 411 on the second substrate 20 is located on a side of a bisector M of the orthogonal projection of the sealant 50 on the second substrate 20 away from the display region AA. In this way, the hole defining region of the light-shielding layer 40 is away from the display region AA, i.e., a region that light leakage may appear in the light-shielding layer 40 is far away from the display region AA, so as to reduce the influence of the light leakage of the light-shielding layer 40 on the display region AA.

Wherein, the bisector M refers to a virtual line that bisects the orthogonal projection of the sealant 50 on the second substrate 20, which makes the orthogonal projection of the sealant 50 on the second substrate 20 is bisected into two equal parts. For example, the bisector bisects the width D2 of the orthogonal projection of the sealant 50 on the second substrate 20

In addition, the first sub-grooves 411 defined in the light-shielding layer 40 are configured corresponding to the edge wirings, so that the edge wirings can replace part of the light-shielding layer 40 for shielding light, so as to remedy light leakage in the hole defining region of the light-shielding layer 40. However, the edge wirings have a problem of reflected light. Therefore, by disposing the first sub-groove 411 at a position away from the display region AA, the influence of the reflected light of the edge wirings on the display region AA can be reduced.

Furthermore, it can be understood that by disposing the first sub-groove 411 at the position away from the display region AA, it is also convenient to relieve the light leakage of the light-shielding layer 40 and the reflected light of the edge wirings. For example, coating black ink, etc., can be performed at a position on the second substrate 20 corresponding to the first sub-grooves 411 to shield light.

Furthermore, the display panel 100 further includes an alignment film layers 60 located on a side of the first substrate 10 facing toward the second substrate 20 and on a side of the second substrate 20 facing toward the first substrate 10. The alignment film layers 60 are configured to align the liquid crystal layer 30 to make liquid crystal molecules of the liquid crystal layer 30 realize uniform arrangement and orientation, so as to maintain a certain configuration in an initial state.

The alignment film layers 60 are located in an region enclosed by the sealant 50. Wherein, the alignment film layer 60 located on the side of the second substrate 20 facing toward the first substrate 10 further covers on the light-shielding layer 40, and an orthogonal projection of the alignment film layer 60 on the first substrate 10 does not overlap with an orthogonal projection of the sealant 50 on the first substrate 10, so as to prevent the alignment film layer 60 to contact with the environment, thereby blocking the path of the water vapor entering into the display panel 100 through the alignment film layer 60, which further improves the encapsulation effect of the display panel 100.

The alignment film layer 60 enables to form an initial state of the liquid crystal molecules of the liquid crystal layer 30, and the first substrate 10 can deflect the liquid crystal molecules of the liquid crystal layer 30, so as to control brightness and darkness of the transmitted light to realize display of the display panel 100. Specifically, the the first substrate 10 includes a base 11, and transistors 12 and pixel electrodes 13 disposed on the base 11. The pixel electrodes 13 are electrically connected to the thin film transistors 12.

Optionally, the thin film transistors 12 are disposed on the base 11, and the base 11 includes a glass substrate, etc. The thin film transistors 12 include active layers 121, gate electrodes 122, source electrodes 123, and drain electrodes 124. The first substrate 10 further includes a gate insulation layer 111 located between the active layers 121 and the gate electrodes 122; an interlayer insulation layer 112 located between the gate electrodes 122, and the source electrodes 123 and the drain electrode 124; and a passivation layer 113 located between the source electrodes 123 and the pixel electrodes 13.

Specifically, the active layers 121 are located on the base 11, and the gate insulation layer 111 covers the active layers 121 and the base 11. The gate electrodes 122 are disposed on the gate insulation layer 111 and are disposed corresponding to channel regions of the active layers 121. The interlayer insulation layer 112 covers on the gate electrodes 122 and the gate insulation layer 111. The source electrodes 123 and the drain electrodes 124 are disposed on the interlayer insulating layer 112, and the source electrodes 123 and the drain electrode 124 are respectively connected to two sides of the channel region of the active layers 121. The passivation layer 113 covers on the source electrodes 123, the drain electrodes 124, and the interlayer insulation layer 112.

The pixel electrodes 13 are disposed on the passivation layer 113. The pixel electrodes 13 are patterned electrodes, and the pixel electrodes 13 are electrically connected to the drain electrodes 124 of the transistors 12. However, the structure of the thin film transistors 12 of the present application is not limited thereto. For example, a bottom-gate structure, or a double gate structure, etc., can also be adopted in the thin film transistors 12.

In order to control deflection of the liquid crystal molecules of the liquid crystal layer 30, the display panel 100 further includes a common electrode (not shown in the figure). The common electrode can be located on the first substrate 10 or the second substrate 20. When the common electrode is located on the first substrate 10, the common electrode can also be disposed in a same layer or a different layer as the pixel electrodes 13, which only needs to ensure that the common electrode and the pixel electrode 13 are insulated to each other. In this way, through controlling a driving voltage on the pixel electrode 13 is by the thin film transistors 12, an electric field is formed between the pixel electrode 13 and the common electrode, which makes the liquid crystal molecules of the liquid crystal layer 30 be deflected, thereby realizing pixel display of the display panel 100.

Of course, in order to realize display of the display panel 100, the display panel 100 further includes an upper polarizer 70 located on a side of the second substrate 20 away from the first substrate 10, a lower polarizer 80 located on a side of the first substrate 10 away from the second substrate 20, and a backlight module 90 located on a side of the lower polarizer 80 away from the first substrate 10.

The backlight module 90 provides backlight for the display panel 100. The backlight of the backlight module 90 is polarized by the lower polarizer 80 and then directed to the liquid crystal layer 30. The liquid crystal molecules of the liquid crystal layer 30 are deflected under effect of the pixel electrode 13 and the common electrode. The deflected liquid crystal molecules refract the backlight provided by the backlight module 90 to the second substrate 20. A color filter is disposed on the second substrate 20. The color filter makes the backlight present different colors after passing through the second substrate 20, and the backlight is polarized by the upper polarizer 70 and then emits, so as to realize the pixel display of the display panel 100. Wherein, the color filter is not limited to be disposed on the second substrate 20. For example, when the first substrate 10 is a color-filter-on-array (COA) substrate, the color filter is disposed on the first substrate 10.

Figure 5:
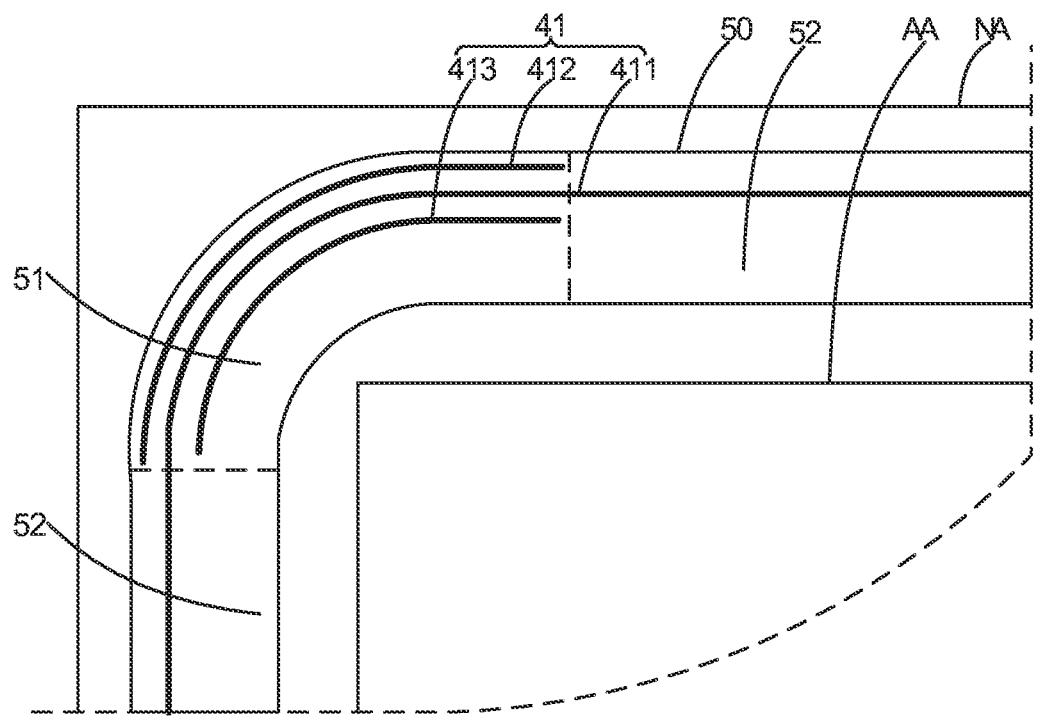
FIG. 5 is a top-view structural schematic diagram of groove arrangement provided by one embodiment of the present application.

In one embodiment, please refer to FIG. 1 to FIG. 5. FIG. 5 is a top-view structural schematic diagram of groove arrangement provided by one embodiment of the present application. The difference from the aforesaid embodiments is that the grooves 41 further include second sub-grooves 412 located on a side of the first sub-grooves 411 and third sub-grooves 413 located on a side of the first sub-grooves 411 away from the second sub-grooves 412, i.e., the second sub-grooves 412 and the third sub-grooves 413 are located on two opposite sides of the first sub-grooves 411 to enhance the water vapor barrier performance of the grooves 41.

Specifically, the sealant 50 includes a plurality of straight-line portions 52 and a plurality of curved portions 51 connected end-to-end, and each of the curved portions 51 is connected between two adjacent straight-line portions 52. The second sub-grooves 412 and the third sub-grooves 413 are both disposed corresponding to the curved portions 51. The curved portions 51 are located at a corner of the display panel 100. Wherein, it can be understood that the sealant 50 are generally formed by a coating process. However, during forming the curved portions 51 of the sealant 50, as the process of coating adhesive material at the curved portions is unstable compared to a process of coating the adhesive material at straight lines, so coating accuracy and widths of the coating adhesive material at the curved portions are not easy to control.

In addition, the upper polarizer 70 and the lower polarizer 80 of the display panel 100 can shrink after having been used a period of time, and shrinkage stress is largest at the corner of the display panel 100. As a result, the water vapor easily enters the display panel 100 from the corner of the display panel 100. Therefore, by defining the second sub-grooves 412 and the third sub-grooves 413 corresponding to the curved portions 51 in the light-shielding layer 40, the ability of blocking the water vapor intrusion at the corner of the display panel 100 is enhanced.

Furthermore, the first sub-grooves 411, the second sub-grooves 412, and the third sub-grooves 413 all correspond to regions of the sealant 50 away from the display region AA, so as to further relieve influence of the light leakage problem that the light-shielding layer 40 may have due to defining holes in the display region AA, while can further remedy a reflection problem during the light-shielding function of the light-shielding layer 40 being compensated by the edge wirings.

Wherein, a width of the second sub-grooves 412 is equal to a width of the first sub-grooves 411, a width of the third sub-grooves 413 is also equal to the width of the first sub-grooves 411, and an interval between the second sub-grooves 412 and the first sub-grooves 411 is equal to an interval between the third sub-grooves 413 and the first sub-grooves 411, so as to facilitate implementation of the processes. For other descriptions please refer to the embodiments mentioned above, and redundant description will not be mentioned herein again.

Figure 6:
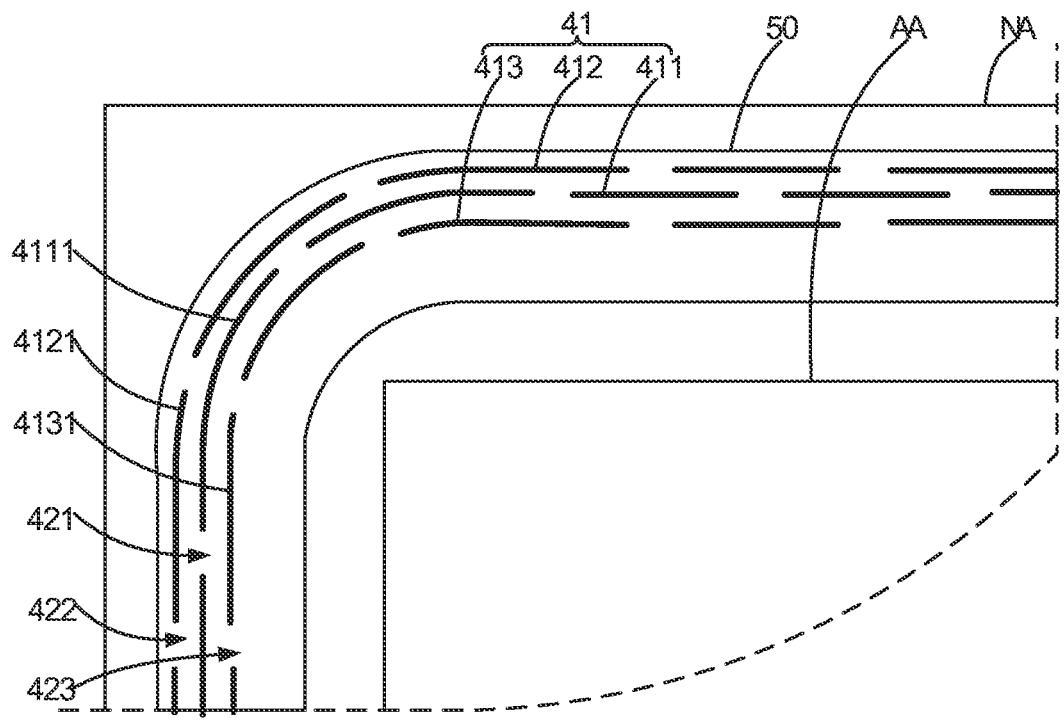
FIG. 6 is another top-view structural schematic diagram of groove arrangement provided by one embodiment of the present application.

In one embodiment, please refer to FIG. 1 to FIG. 6. FIG. 6 is another top-view structural schematic diagram of groove arrangement provided by one embodiment of the present application. The difference from the aforesaid embodiments is that the second sub-grooves 412 are defined corresponding to the straight-line portions 52, and the third sub-grooves 413 are defined corresponding to the straight-line portions 52, i.e., the second sub-grooves 412 enclose the display region AA, and the third sub-grooves 413 also enclose the display region AA, so as to further enhance the water vapor barrier performance of the grooves 41.

However, defining too many sub-grooves 41 can reduce the contact area between the light-shielding layer 40 and the second substrate 20, which may cause peeling off to appear in the light-shielding layer 40. Therefore, discontinuous arrangement is adopted in the structure of the grooves 41 of this embodiment. Under a precondition of satisfying enhancement of the water vapor barrier performance of the grooves 41, excessive reduction of the contact area between the light-shielding layer 40 and the second substrate 20 is prevented.

Specifically, the first sub-grooves 411 include a plurality of first groove portions 4111 spaced apart. The plurality of first groove portions 4111 are sequentially arranged spaced apart in an annular route enclosing the display region AA. A first interval 421 is between two adjacent first groove portions 4111.

The second sub-grooves 412 include a plurality of second groove portions 4121 spaced apart. The plurality of second groove portions 4121 are sequentially arranged spaced apart in an annular route enclosing the display region AA. A second interval 422 is between two adjacent second groove portions 4121. The first intervals 421 and the second intervals 422 are arranged in a stagger manner.

The third sub-grooves 413 include a plurality of third groove portions 4131 spaced apart. The plurality of third groove portions 4131 are sequentially arranged spaced apart in an annular route enclosing the display region AA. A third interval 423 is between two adjacent third groove portions 4131. The first intervals 421 and the third intervals 423 are also arranged in a stagger manner. The third intervals 423 is defined opposite to the second intervals 422.

In this way, any one of the first interval 421, the second interval 422, or the third interval 423 corresponds to at least one of the sub-groove structures. For example, the first intervals 421 correspond to the second sub-grooves 412 and the third sub-grooves 413, and the second intervals 422 and the third intervals 423 correspond to the first sub-grooves 411, so as to ensure the ability of the grooves 41 to block the water vapor. Meanwhile, because existences of the first intervals 421, the second intervals 422, and the third intervals 423 are equivalent to increasing the contact areas between the light-shielding layer 40 and the second substrate 20, risk of peeling off appearing in the light-shielding layer 40 is reduced.

Optionally, lengths of the first intervals 421, the second intervals 422, and the third intervals 423 are all equal. For example, the length of the first intervals 421 is equal to the length of the second intervals 422, the length of the second intervals 422 is equal to the length of the third intervals 423, and the lengths of the first intervals 421, the second intervals 422, and the third intervals 423 range from 10 μm to 200 μm, which makes the first groove portions 4111, the second groove portions 4121, and the third groove portion 4131 are arranged uniformly, so as to facilitate implementation of the processes, while ensures the sufficient contact areas between the light-shielding layer 40 and the second substrate 20.

Furthermore, the first sub-grooves 411, the second sub-grooves 412, and the third sub-grooves 413 all correspond to regions of the sealant 50 away from the display region AA, so as to further relieve influence of the light leakage problem that the light-shielding layer 40 may have due to defining holes in the display region AA, while can further remedy a reflection problem during the light-shielding function of the light-shielding layer 40 being compensated by the edge wirings. Wherein, the width of the second sub-grooves 412 is equal to the width of the first sub-grooves 411, the width of the third sub-grooves 413 is also equal to the width of the first sub-grooves 411, and the interval between the second sub-grooves 412 and the first sub-grooves 411 is equal to the interval between the third sub-grooves 413 and the first sub-grooves 411, so as to facilitate implementation of the processes. For other descriptions please refer to the embodiments mentioned above, and redundant description will not be mentioned herein again.

Figure 7:
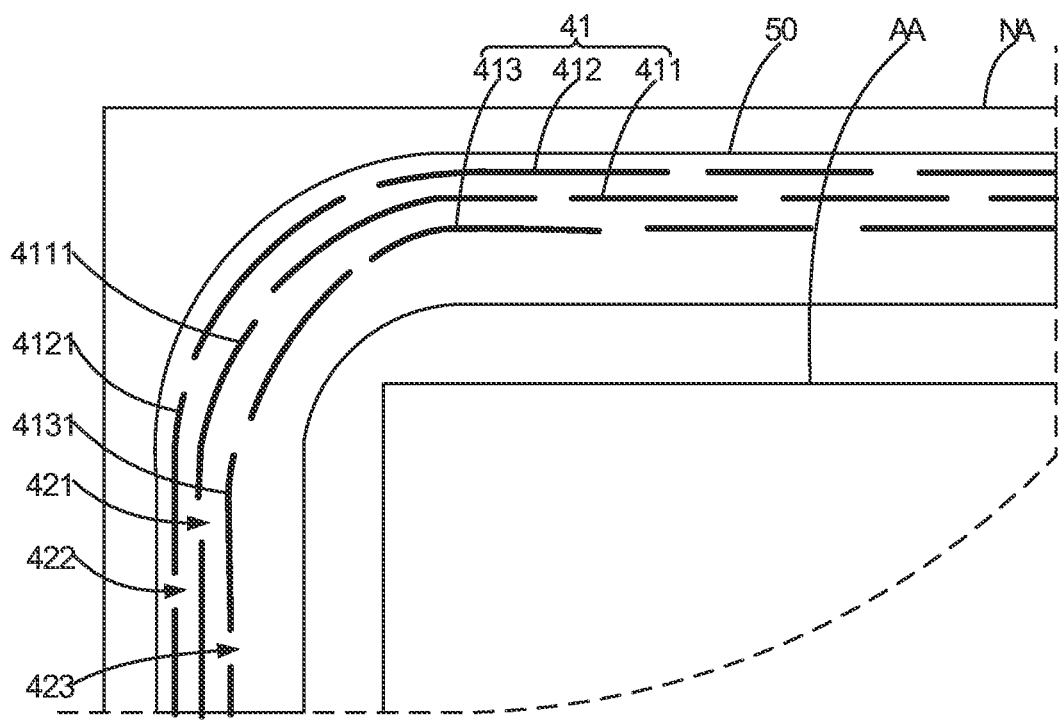
FIG. 7 is still another top-view structural schematic diagram of groove arrangement provided by one embodiment of the present application.

In one embodiment, please refer to FIG. 1 to FIG. 7. FIG. 7 is still another top-view structural schematic diagram of groove arrangement provided by one embodiment of the present application. The difference from the aforesaid embodiments is that the second intervals 422 and the third intervals 423 are also arranged in a stagger manner, which makes each interval correspond to two sub-grooves 41 structures, so as to further enhance the water vapor barrier performance of the grooves 41.

Specifically, the first sub-grooves 411 include the plurality of first groove portions 4111. The first interval 421 is between two adjacent first groove portions 4111. The second sub-grooves 412 include the plurality of second groove portions 4121. The second interval 422 is between two adjacent second groove portions 4121. The first intervals 421 and the second intervals 422 are arranged in a stagger manner.

The third sub-grooves 413 include the plurality of third groove portions 4131. The third interval 423 is between two adjacent third groove portions 4131. The second intervals 422 and the third intervals 423 are also arranged in a stagger manner.

In this way, any one of intervals of the first interval 421, the second interval 422, or the third interval 423 corresponds to the structures of two sub-groove 41. For example, the first intervals 421 correspond to the second sub-grooves 412 and the third sub-grooves 413, and the second intervals 422 correspond to the first sub-grooves 411 and the third sub-grooves 413, the third intervals 423 correspond to the first sub-grooves 411 and the second sub-grooves 412, so as to further ensure the ability of the grooves 41 to block the water vapor.

Meanwhile, because existences of the first intervals 421, the second intervals 422, and the third intervals 423 are equivalent to increasing the contact areas between the light-shielding layer 40 and the second substrate 20, risk of peeling off appearing in the light-shielding layer 40 is reduced. For other descriptions please refer to the embodiments mentioned above, and redundant description will not be mentioned herein again.

Figure 8:
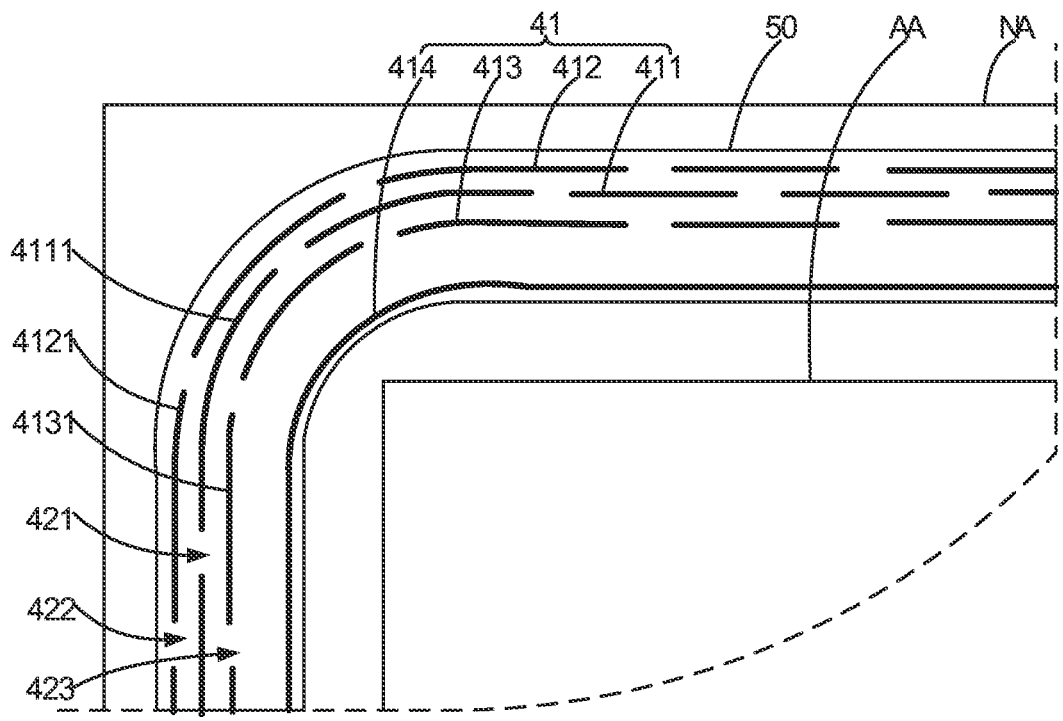
FIG. 8 is further another top-view structural schematic diagram of groove arrangement provided by one embodiment of the present application.

In one embodiment, please refer to FIG. 1 to FIG. 8. FIG. 8 is further another top-view structural schematic diagram of groove arrangement provided by one embodiment of the present application. The difference from the aforesaid embodiments is that the grooves 41 further include fourth sub-grooves 414 located on a side of the third sub-grooves 413 away from the first sub-grooves 411, and the fourth sub-grooves 414 correspond to a region of the sealant 50 close to the display region AA, so as to further enhance the water vapor barrier performance of the grooves 41.

Specifically, regarding the display panel 100 with the sealant 50 of a relative narrow width, e.g., the width of the sealant 50 is less than or equal to 300 μm, the encapsulation effect of the display panel 100 can be affected at this time. In this way, by defining the fourth sub-grooves 414 corresponding to the region of the sealant 50 close to the display region AA in the light-shielding layer 40, the water vapor barrier performance of the groove 41 can be enhanced, and the encapsulation effect of the display panel 100 can be improved.

Furthermore, the first sub-grooves 411, the second sub-grooves 412, and the third sub-grooves 413 all correspond to the regions of the sealant 50 away from the display region AA, so as to further relieve influence of the light leakage problem that the light-shielding layer 40 may have due to defining holes in the display region AA, while can further remedy a reflection problem during the light-shielding function of the light-shielding layer 40 being compensated by the edge wirings.

Wherein, the width of the fourth sub-grooves 414 is equal to the width of the first sub-grooves 411, the width of the second sub-grooves 412 is also equal to the width of the first sub-grooves 411, the width of the third sub-grooves 413 is also equal to the width of the first sub-grooves 411, and the interval between the second sub-grooves 412 and the first sub-grooves 411 is equal to the interval between the third sub-grooves 413 and the first sub-grooves 411, so as to facilitate implementation of the processes. For other descriptions please refer to the embodiments mentioned above, and redundant description will not be mentioned herein again.

Figure 9:
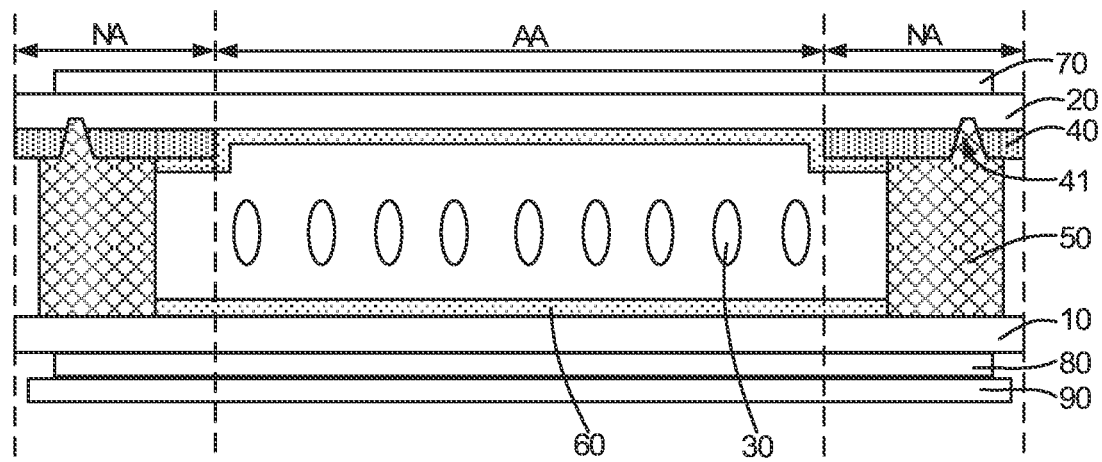
FIG. 9 is a schematic diagram of another sectional structure of the display panel provided by one embodiment of the present disclosure.

In one embodiment, please refer to FIG. 1 to FIG. 9. FIG. 9 is a schematic diagram of another sectional structure of the display panel provided by one embodiment of the present disclosure. The difference from the aforesaid embodiments is that the grooves 41 penetrate the light-shielding layer 40 and extend into a part of the second substrate 20, so as to enhance the combining ability of the light-shielding layer 40 and the second substrate 20 to prevent the light-shielding layer 40 from peeling off.

Meanwhile, as an extension path of the grooves 41 is lengthened, which is equivalent to increasing the intrusion path of the water vapor, so the performance of the groove 41 to block the water vapor is enhanced. Furthermore, the groove 41 extending into the second substrate 20 also blocks the path of the water vapor entering the display panel 100 along a contact interface between the light-shielding layer 40 and the second substrate 20, which further improves the encapsulation effect of the display panel 100. For other descriptions please refer to the embodiments mentioned above, and redundant description will not be mentioned herein again.

Figure 10:
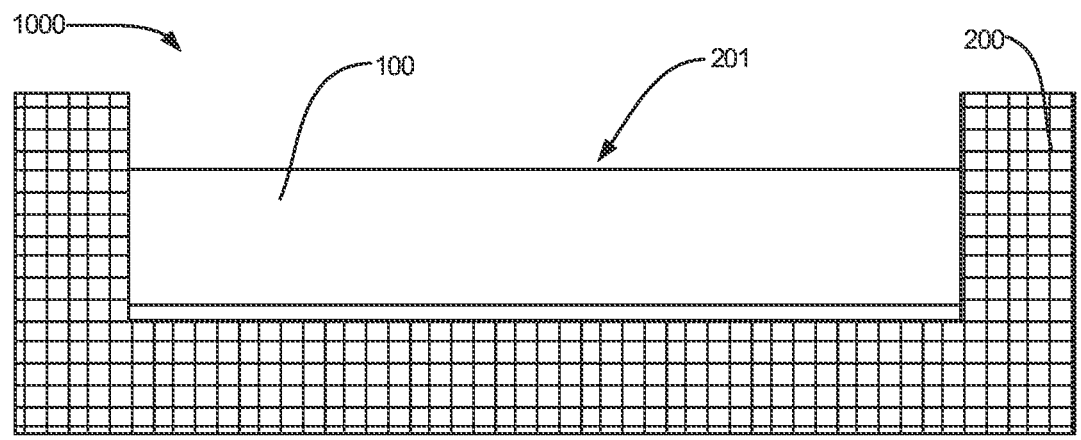
FIG. 10 is a schematic diagram of a sectional structure of an electronic device provided by one embodiment of the present application.

On the basis of the same invention construct, one embodiment of the present application further provides an electronic device. Please combine and refer to FIG. 1 and FIG. 10. FIG. 10 is a schematic diagram of a sectional structure of an electronic device provided by one embodiment of the present application. The electronic device 1000 includes a housing 200 and the display panel 100 of one of the aforesaid embodiments. A storage cavity 201 is formed in the housing 200. The display panel 100 is assembled in the storage cavity 201. The electronic device 100 includes an electronic product such as a mobile phone, a television, a tablet, etc.

According to the aforesaid embodiments, it can be understood that:

The present application provides the display panel and the electronic device. The display panel includes the display region and the non-display region enclosing the display region. The display panel further includes the first substrate and the second substrate disposed opposite to each other, and the liquid crystal layer disposed between the first substrate and the second substrate and corresponding to the display region. The light-shielding layer is disposed on a side of the second substrate facing toward the first substrate and is disposed corresponding to the non-display region. The sealant is disposed between the first substrate and the light-shielding layer and encloses the liquid crystal layer. The grooves are defined at positions corresponding to the sealant in the light-shielding layer. The grooves penetrate the light-shielding layer. By defining the grooves in the light-shielding layer corresponding to the sealant, and by penetrating the light-shielding layer by the grooves, the path of the water vapor entering into the display panel through the light-shielding layer is blocked, which solves the problem of the intrusion path of the water vapor in the current liquid crystal display panels.

In the embodiments mentioned above, the descriptions to the various embodiments are emphasized, and the part is not described in detailed in an embodiment, can refer to the detailed description of other embodiments mentioned above.

The embodiments of present application are described in detail above. This article uses specific cases for describing the principles and the embodiments of the present application, and the description of the embodiments mentioned above is only for helping to understand the method and the core idea of the present application. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present application.

What is claimed is:

1. A display panel, comprising a display region and a non-display region enclosing the display region, wherein the display panel comprises:
   a first substrate;
   a second substrate disposed opposite to the first substrate;
   a liquid crystal layer disposed between the first substrate and the second substrate;
   a light-shielding layer disposed on a side of the second substrate facing toward the first substrate;
   a sealant disposed between the first substrate and the light-shielding layer and enclosing the liquid crystal layer, wherein the sealant comprises a plurality of straight-line portions and a plurality of curved portions connected end-to-end, and each of the curved portions is connected between two adjacent straight-line portions; and
   edge wirings disposed in the non-display region,
   wherein grooves are defined in the light-shielding layer at corresponding regions where the sealant is disposed, the grooves comprise first sub-grooves, the first sub-grooves are configured corresponding to the edge wirings disposed in the non-display region and corresponding to regions of the sealant away from the display region, wherein the grooves further comprise second sub-grooves located on a side of the first sub-grooves and third sub-grooves located on a side of the first sub-grooves away from the second sub-grooves, the first sub-grooves, the second sub-grooves, and the third sub-grooves are all located on a side of a bisector of an orthogonal projection of the sealant on the second substrate away from the display region and the bisector refers to a virtual line that bisects the orthogonal projection of the sealant on the second substrate, which makes the orthogonal projection of the sealant on the second substrate is bisected into two equal parts, and
   wherein the first sub-grooves are connected to form a ring shape and extend along each of the plurality of straight-line portions and the plurality of curved portions connected end-to-end of the sealant, both of the second sub-grooves and the third sub-grooves continuously extend along each of the curved portions of the sealant, and the second sub-grooves and the third sub-grooves are not disposed along each of the straight-line portions of the sealant, wherein each of the curved portions is located on corners of the display panel.

2. The display panel as claimed in claim 1, wherein the first sub-grooves enclose the display region.

3. The display panel as claimed in claim 2, wherein the first sub-grooves comprise a plurality of first groove portions spaced apart, the plurality of first groove portions are sequentially arranged spaced apart in an annular route enclosing the display region, and first intervals are between adjacent two of the plurality of first groove portions.

4. The display panel as claimed in claim 3, wherein the first intervals are arranged in a stagger manner.

5. The display panel as claimed in claim 3, wherein lengths of the first intervals range from 10 μm to 200 μm.

6. The display panel as claimed in claim 1, wherein the grooves comprise fourth sub-grooves located on a side of the third sub-grooves away from the first sub-grooves, and the fourth sub-grooves correspond to regions of the sealant close to the display region.

7. The display panel as claimed in claim 6, wherein widths of the first sub-grooves, the second sub-grooves, the third sub-grooves, and the fourth sub-grooves range from 10 μm to 30 μm.

8. The display panel as claimed in claim 1, wherein the grooves penetrate the light-shielding layer.

9. The display panel as claimed in claim 8, wherein the grooves penetrate the light-shielding layer and extend into a part of the second substrate.

10. The display panel as claimed in claim 1, wherein the sealant is filled in the grooves.

11. The display panel as claimed in claim 1, wherein a sectional shape of the grooves comprises a trapezoidal shape, and an opening of the grooves at a side close to second substrate is smaller than an opening of the grooves at a side away from the second substrate.

12. An electronic device, comprising a housing and the display panel as claimed in claim 1, wherein the housing forms a storage cavity, and the display panel is assembled in the storage cavity.

13. The display panel as claimed in claim 1, wherein the display panel further comprises a first alignment film layer located on a side of the first substrate facing toward the second substrate and a second alignment film layer located on a side of the second substrate facing toward the first substrate, the first alignment film layer and the second alignment layer are located in a region enclosed by the sealant; wherein the second alignment layer located on the side of the second substrate facing toward the first substrate further covers on the light-shielding layer, and orthogonal projections of the first alignment film layer and the second alignment film layer on the first substrate do not overlap with an orthogonal projection of the sealant on the first substrate.

* * * * *